Figure 1:
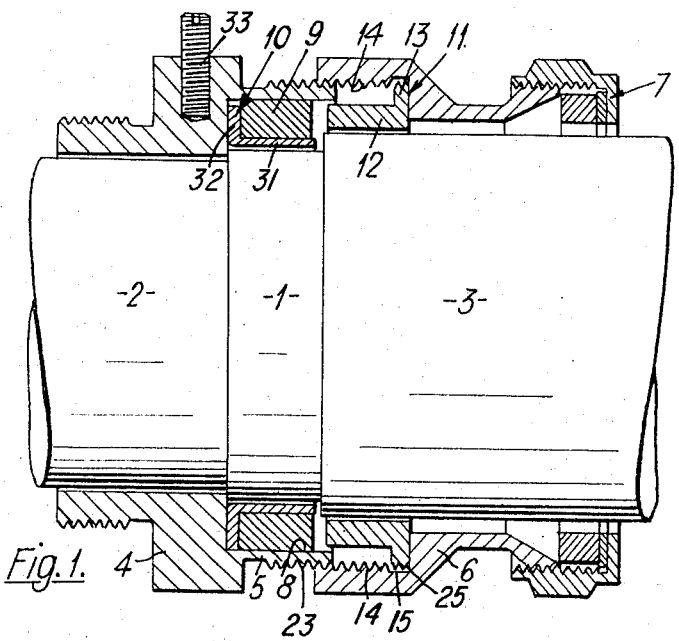

United States Patent [19]
Hutchison

[11] 3,869,155
[45] Mar. 4, 1975

[54] CABLE GLANDS

[75] Inventor: John Blundell Hutchison, Formby, England

[73] Assignee: British Insulated Callender's Cables Limited, London, England

[22] Filed: Dec. 8, 1972

[21] Appl. No.: 313,410

[30] Foreign Application Priority Data
Dec. 14, 1971 Great Britain ............... 57932/71

[52] U.S. Cl. ............................ 285/158, 285/348
[51] Int. Cl. ........................................... F16l 5/02
[58] Field of Search .......... 285/158, 161, 348, 35, 285/353, 354, 239, 54, 382.7, 249, 355; 277/235–237

[56] References Cited
UNITED STATES PATENTS

| | | | |
|---|---|---|---|
| 2,318,575 | 5/1943 | Armington et al............. | 285/348 X |
| 2,478,149 | 8/1949 | Wolfram et al................ | 285/354 X |
| 2,567,527 | 9/1951 | Parks............................. | 285/348 X |
| 3,700,268 | 10/1972 | Nielsen.......................... | 285/348 X |

*Primary Examiner*—Geo. V. Larkin
*Attorney, Agent, or Firm*—Buell, Blenko and Ziesenheim

[57] ABSTRACT

A sealing gland for a cable having at least one metallic sheathing layer comprises a first gland member made of metal; a second gland member in screw-threaded engagement with the first gland member; and between the first and second gland members a third gland member captively engaged with the second gland member in a manner allowing relative rotation thereof. Between the first and third gland members is a composite annular seal comprising at least one elastomeric ring and for each elastomeric ring a relatively thin insert of a soft metal including a tubular first part which can be inserted between a metallic sheathing layer of a cable passing through the gland and the ring, or the respective ring if there is more than one, and a second part which is located between the ring or one of the rings and the first gland member. Upon screwing the first and second gland members together the first and third gland members are urged towards one another, without relative rotation, to compress the seal into contact with at least one metallic sheathing layer of a cable. If two layers are to be contacted, two rings differing in external as well as internal diameter may be used and the second parts of both soft metal inserts may lie between the larger ring and a shoulder forming a step in a counterbore in the first gland member in which the composite seal is inserted, preferably as a force fit.

7 Claims, 2 Drawing Figures

PATENTED MAR 4 1975

3,869,155

CABLE GLANDS

In the specification of French Utility Model No. 7128642 in the name of British Insulated Callender's Cables Limited, published on Apr. 14, 1972, which relates to an invention of the present applicant, there is disclosed a sealing gland for a cable having a metallic sheathing layer comprising: a pair of gland members including at least a first gland member which is metallic; between said gland members a composite seal comprising a ring of elastomeric material and a relatively thin insert of a soft metal including a tubular first part which can be inserted between the metallic sheathing layer of the cable and the ring and a second part which is or can be located between the ring and the first gland member; and means for urging the said gland members towards one another, without relative rotation, to compress the seal into contact with the metallic sheathing layer. Such a gland can be used to make contact with a metallic armouring or screening layer of a cable instead of with an actual metallic sheath, and all such layers are included in the expression "sheathing layer."

The glands described by way of example in the French Utility Model specification referred to above are intended for use with a cable having a wire armour layer over the sheathing layer to be contacted; the present invention is an improvement in or modification of the main invention and is especially but not exclusively applicable when there is no such wire armour layer.

In accordance with the invention, a sealing gland for a cable having at least one metallic sheathing layer comprises: a first gland member made of metal; a second gland member in or for screw-threaded engagement with the first gland member; between the first and second gland members a third gland member captively engaged with the second gland member in a manner allowing relative rotation thereof; and between the first and third gland members a composite annular seal comprising at least one elastomeric ring and for each elastomeric ring a relatively thin insert of a soft metal including a tubular first part which can be inserted between a metallic sheathing layer of a cable passing through the gland and the ring, or the respective ring if there is more than one, and a second part which is or can be located between the ring or one of the rings and the first gland member: so that upon screwing the first and second gland members together the first and third gland members are urged towards one another, without relative rotation, to compress the seal into contact with at least one metallic sheathing layer of the cable.

It will be observed that the first and third gland members of the present invention constitute the pair of gland members referred to, sometimes as the "first" and "second" gland members, in the French Utility Model specification referred to above.

The or each elastomeric ring may be of any cross sectional shape suited to the design of the gland members which engage it, but it is preferable for its bore to be of uniform circular section and for an end of the ring, or each ring if there is more than one, which engages the second part on the insert, or any of the inserts, to be plane, both before compression of the seal. If the third gland member provides a female conical surface or a square shoulder for engagement with the seal, a plain rectangular elastomeric ring can be used adjacent to it. The or each ring is preferably of polychloroprene (neoprene) but other elastomeric materials, for example, butadiene-acrylonitrile or ethylene-propylene rubbers, can be used.

The or each soft-metal insert is preferably a ring of L-shaped section and the tubular portion thereof preferably extends through the or the respective elastomeric ring for at least half the length of the latter and preferably for its whole length; it may even project beyond the end of the elastomeric ring. If desired, however, this tubular part may be shorter than the elastomeric ring to the extent that when the seal is compressed the elastomeric ring as well as the soft metal insert engages the metallic sheathing layer of the cable. Other possibilities are for the insert to be shaped to cover the whole of the inner surface and all or an inner part of each end surface of the elastomeric ring, or to cover the whole of one end surface and the whole or a contiguous part of each of the inner and outer surfaces of the ring, or even both, though it will be appreciated that some of those shapes require that the insert be formed in situ on the elastomeric ring. Any metal that is soft enough to deform plastically to the necessary extent can be used, but the preferred soft metal is lead.

Where only a single sheathing layer is to be contacted, a one-ring seal will normally be adequate, but for contacting two such layers a two-ring seal will usually be necessary. Use of more than two rings is difficult and in the rare cases where more than two contacts with concentric layers are required it may be preferable to use two (or more) separate seals compressed between different sets of gland members.

Preferably the seal is accommodated in a counterbore in the end of the first gland member, and preferably the screw thread on the first gland member that engages the second gland member is a male thread. When there are two (or more) elastomeric rings in the seal, they will normally differ in internal diameter; preferably they also differ in external diameter, in which case the counterbore should be correspondingly stepped. The second part of each soft metal insert may then be located between its own ring and the base of the counterbore section that accommodates it, but when there are exactly two rings of unequal external diameter it is preferable to locate the second part of each ring between the elastomeric ring of larger external diameter and the shoulder that defines the step in the counterbore.

If the screw-threaded engagement of the first and second gland members is such that the latter has a female thread, a particularly simple and convenient method of making the third gland member captive can be adopted. In this method, an enlarged recess is formed at the base of the female screw thread and the third gland member is formed with a short enlarged section which is provided with a complementary male thread. This can then be screwed into the second gland member until it passes through the thread therein and enters the recess, where it becomes freely rotatable. Apart from this enlarged threaded portion, the third gland member may be a simple sleeve.

The invention includes electric cable terminations in which electrical connection is made, through the insert of soft metal and the first gland member to a metallic sheathing layer or layers which may be a metal sheath, an armour layer, a screening layer, or more than one of these, using a gland as described.

The gland in accordance with the invention has the advantage that only two separable parts, other than the composite seal itself, will be required in most cases. The composite seal is preferably made a force fit in the first gland member so that when it is assembled in that member the gland, including the composite seal, is effectively a two-part gland.

The invention will be further described, by way of example, with reference to the accompanying drawings in which each of the FIGURES is a longitudinal section through a different form of gland in accordance with the invention.

FIG. 1 shows a gland for contacting a metal sheath 1 that surrounds a cable core 2 and is itself surrounded by a plastics oversheath 3. The gland (which is illustrated as assembled but before tightening) includes a first member 4 which can be mounted in an aperture and carries a spigot 5 having a male screw thread 23.

On this spigot is threaded a second gland member 6 in the form of a "screw thimble" or "barrel" having a female thread 24 complementary with the thread 23. The screw thimble 6 bears at its free end an outer seal assembly 7 of conventional form. In a counterbore 8 in the first gland member is received a composite seal comprising a rectangular polychloroprene ring 9 and a lead insert 10 comprising a tubular first part 31 and a planar second part 32; the ring is a stretch fit on the tubular part 31 and, when stretched, is a push fit in the counterbore.

Between the composite seal and the second gland member 6 is a third gland member 11 comprising a ring 12 and a flange 13 which flange is threaded at 25 on its peripheral surface. The thread on the flange 13 is complementary to the female thread 14 in the second gland member, and the third gland member is made captive in the second by screwing the members together until the flange 13 enters a recess 15 beyond the end of the thread 14, whereupon the member 11 becomes freely rotatable.

Figure 2:
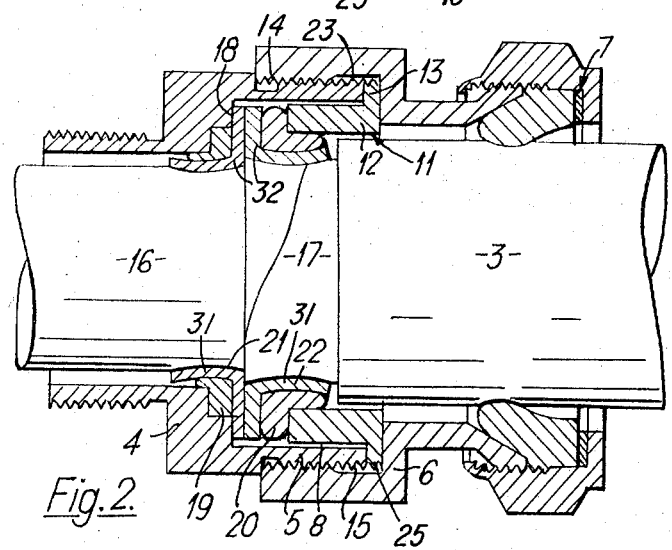

The gland shown (in the fully tightened condition) in FIG. 2 is designed to contact both a lead sheath 16 and a metal tape layer 17 of the cable. It is generally similar to that just described except that the counterbore 8 is stepped to form a shoulder 18. There are two polychloroprene rings, 19, 20 with respective lead inserts 21, 22, both of which are gripped between the shoulder 18 and the larger ring 20, other references have the same significance as in FIG. 1.

A stud 33 (FIG. 1) may be provided for an external earth connection if required.

What I claim as my invention is:

1. A sealing gland for a cable having at least one metallic sheathing layer comprising: a first tubular gland member made of metal; a second tubular gland member aligned and in screw-threaded engagement with the first gland member; between said first and second gland members and aligned with them a third tubular gland member captively engaged with said second gland member and freely rotatable with respect thereto; and between said first and third gland members a composite annular seal comprising an elastomeric ring and insert of a soft metal which insert includes a tubular first part within the bore of said elastomeric ring and a second part located between said ring and said first gland member.

2. A sealing gland as claimed in claim 1 wherein said first gland member has a male screw thread and said second gland member a complementary female screw thread and wherein said third gland member has a section of greatest external diameter bearing a complementary male screw thread and is captively engaged in a recess at the base of the said female screw thread in the second gland member.

3. A sealing gland as claimed in claim 1 in which said composite seal is force fitted in a counterbore in said first gland member.

4. A sealing gland for a cable having two metallic sheathing layers comprising: a first tubular gland member made of metal; a second tubular gland member aligned and in screw-threaded engagement with the first gland member; between said first and second gland members and aligned with them a third tubular gland member freely rotatable with respect to second gland member; and between said first and third gland members and in a counterbore in the first gland member a composite annular seal comprising two axially spaced elastomeric rings differing in both their internal and their external diameters and for each elastomeric ring a relatively thin insert of a soft metal; each said insert including a tubular first part within the bore of the respective one of said elastomeric rings and a second part which is located between the one of said rings having the larger external diameter and a shoulder defining a step in said counterbore in the first gland member.

5. A sealing gland as claimed in claim 4 in which said third gland member is captively engaged with said second gland member.

6. A sealing gland as claimed in claim 5 wherein said first gland member has a male screw thread and said second gland member a complementary female screw thread and wherein said third gland member has a section of greatest external diameter bearing a complementary male screw thread and is captively engaged in a recess at the base of the said female screw thread in the second gland member.

7. A sealing gland as claimed in claim 4 in which said composite seal is force fitted in said counterbore.

* * * * *